United States Patent
Lv et al.

(10) Patent No.: US 11,965,055 B2
(45) Date of Patent: Apr. 23, 2024

(54) WATERBORNE POLYURETHANE ACRYLATE EMULSION AND APPLICATION THEREOF

(71) Applicant: Zhejiang UVCHEM Special Coatings Co., Ltd, Zhejiang (CN)

(72) Inventors: Bo Lv, Zhejiang (CN); Yuping Wang, Zhejiang (CN); Ligang Yu, Zhejiang (CN); Fuliang Peng, Zhejiang (CN)

(73) Assignee: Zhejiang UVCHEM Special Coatings Co., Ltd, Zhejiang (CN)

( * ) Notice: Subject to any disclaimer, the term of this patent is extended or adjusted under 35 U.S.C. 154(b) by 0 days.

(21) Appl. No.: 18/272,120

(22) PCT Filed: Dec. 24, 2021

(86) PCT No.: PCT/CN2021/141098
§ 371 (c)(1),
(2) Date: Jul. 13, 2023

(87) PCT Pub. No.: WO2022/151949
PCT Pub. Date: Jul. 21, 2022

(65) Prior Publication Data
US 2024/0067768 A1    Feb. 29, 2024

(30) Foreign Application Priority Data

Jan. 13, 2021   (CN) .......................... 202110040384.X
Nov. 12, 2021  (CN) .......................... 202111341921.0

(51) Int. Cl.
| | |
|---|---|
| C08G 18/12 | (2006.01) |
| C08F 2/46 | (2006.01) |
| C08F 222/10 | (2006.01) |
| C08G 18/22 | (2006.01) |
| C08G 18/44 | (2006.01) |
| C08G 18/48 | (2006.01) |
| C09D 4/06 | (2006.01) |
| C09D 5/02 | (2006.01) |
| C09D 175/14 | (2006.01) |

(52) U.S. Cl.
CPC ............... *C08G 18/12* (2013.01); *C08F 2/46* (2013.01); *C08F 222/103* (2020.02); *C08F 222/105* (2020.02); *C08F 222/1065* (2020.02); *C08G 18/227* (2013.01); *C08G 18/44* (2013.01); *C08G 18/4833* (2013.01); *C09D 4/06* (2013.01); *C09D 5/022* (2013.01); *C09D 175/14* (2013.01)

(58) Field of Classification Search
CPC ........ C08G 18/4833; C09D 4/00; C09D 4/06; C09D 5/022; C09D 175/14; C09D 175/16
See application file for complete search history.

(56) References Cited

U.S. PATENT DOCUMENTS

| | | | |
|---|---|---|---|
| 2007/0106017 A1 | 5/2007 | Kessel | |
| 2012/0225969 A1 | 9/2012 | Miyabayashi et al. | |
| 2012/0258324 A1* | 10/2012 | Kim .................. | C09D 4/00 522/170 |

FOREIGN PATENT DOCUMENTS

| | | | |
|---|---|---|---|
| CN | 103214653 A | | 7/2013 |
| CN | 104629060 A | | 5/2015 |
| CN | 105669938 A | | 6/2016 |
| CN | 106675275 A | | 5/2017 |
| CN | 107254250 A | | 10/2017 |
| CN | 107254251 A | | 10/2017 |
| CN | 107446108 A | | 12/2017 |
| CN | 107446484 A | | 12/2017 |
| CN | 108264644 A | | 7/2018 |
| CN | 108531042 A | | 9/2018 |
| CN | 109535982 A | | 3/2019 |
| CN | 109666396 A | * | 4/2019 |
| CN | 109762461 A | | 5/2019 |
| CN | 109970944 A | | 7/2019 |
| CN | 110483698 A | | 11/2019 |
| CN | 110615885 A | | 12/2019 |
| CN | 111171702 A | | 5/2020 |
| CN | 112831268 A | | 5/2021 |
| IN | 112852286 A | | 5/2021 |
| WO | WO2006103228 A1 | | 10/2006 |

OTHER PUBLICATIONS

CN109666396 English Machine Translation prepared Jan. 31, 2024. (Year: 2024).*
WIPO, International Search Report issued on Mar. 1, 2022.
China Patent Office, the First office action with the search report for corresponding Chinese application 202110040384.X dated Sep. 7, 2021.
China Patent Office, the First office action with the search report for corresponding Chinese application 202111341921.0 dated Mar. 2, 2022.
China Patent Office, the Second office action with the search report for corresponding Chinese application 202111341921.0 dated Aug. 3, 2022.

* cited by examiner

*Primary Examiner* — Christopher M Rodd
(74) *Attorney, Agent, or Firm* — Li & Cai Intellectual Property (USA) Office

(57) ABSTRACT

A waterborne polyurethane acrylate emulsion, comprising the following raw material components: a polyurethane acrylate prepolymer and a polyurethane acrylate oligomer. After ultraviolet curing, the waterborne polyurethane acrylate emulsion exhibits excellent mechanical strength and good wear resistance. The matt coatings produced therefrom has a fine matt fineness after curing.

7 Claims, No Drawings

WATERBORNE POLYURETHANE ACRYLATE EMULSION AND APPLICATION THEREOF

CROSS REFERENCE TO RELATED APPLICATION

This is a National Phase Application filed under 35 U.S.C. 371 as a national stage of PCT/CN2021/141098, filed on Dec. 24, 2021, an application claiming the benefit of Chinese Application No. 202110040384.X, filed on Jan. 13, 2021, and Chinese Application No. 202111341921.0, filed on Nov. 12, 2021, the content of each of which is incorporated herein by reference in their entirety.

FIELD OF THE INVENTION

The present invention relates to the technical field of coatings, and in particular to a waterborne polyurethane acrylate emulsion and a waterborne matte coatings produced therefrom.

BACKGROUND

In the field of coatings, matt coatings refers to a type of coatings that has a relatively low gloss level compared to high gloss coatings. Typically, the gloss level of the matt coatings, measured at a 60-degree angle, is below 20. Matt coatings is known for its soft appearance and strong texture. It has gained significant attention and wide application in high-end industries such as 3C electronics and cosmetics. In particular, highly wear-resistant matt coatings has been favored by the market. Furthermore, with the increasing emphasis on environmental protection in recent years, the development of highly wear-resistant waterborne matt coatings has been accelerated.

Waterborne polyurethane acrylate emulsion is a waterborne resin that is dispersed using water instead of solvents. The use of water in this system instead of solvents makes it environmentally friendly. By using waterborne polyurethane acrylate emulsion to prepare matt coatings, it is possible to alleviate environmental concerns. Additionally, this matt coatings exhibits excellent wear resistance, adhesion, and flexibility due to the polyurethane component, as well as weather resistance and gloss retention due to the acrylate component. However, the application of waterborne matt coatings made from conventional waterborne polyurethane acrylate is limited due to its rough appearance and poor fineness of the matting powder.

On the other hand, in order to improve the wear resistance of matt coatings, some prior arts (such as Chinese patent application publication CN108531042A and CN107446484A etc.) propose the introduction of silica inorganic components during the preparation of matt coatings. However, the compatibility issues between the inorganic component, such as silica, and the polymer components pose limitations on the wider application of such wear resistance matt coatings.

Therefore, the prior art for waterborne matt coatings, whether in terms of matte fineness or wear resistance, have not yet met the requirements for the appearance and practicality (such as wear resistance) of coating films. There is still significant room for improvement in these areas.

SUMMARY

The objective of the present invention is to improve the shortcomings of the prior art technology. In order to achieve this technical objective, the present invention proposes a waterborne polyurethane acrylate emulsion. The raw materials used in this emulsion are all polymer components, resulting in excellent compatibility. The matt coatings prepared using this emulsion exhibits sufficient hardness, excellent wear resistance, and fine matt fineness.

According to the first aspect of the present invention, a waterborne polyurethane acrylate emulsion, which is characterized in that it includes the following raw material components, in parts by weight: polyurethane acrylate prepolymer and polyurethane acrylate oligomer.

According to the second aspect of the present invention, the waterborne polyurethane acrylate emulsion is characterized in that the polyurethane acrylate prepolymer comprises the following raw material components: oligomeric diol, polyisocyanate, and a second UV-curable monomer.

The synergistic or enhancing effect between the various components mentioned above is achieved because the polyurethane acrylate prepolymer and polyurethane acrylate oligomer have specific chain lengths and molecular structures. After ultraviolet curing, the waterborne polyurethane acrylate emulsion exhibits excellent mechanical strength and good wear resistance.

Furthermore, the waterborne polyurethane acrylate emulsion utilizes a polyurethane acrylate prepolymer with a low content of organic solvents, which provides hydrophilicity and promotes environmental friendliness.

According to the third aspect of the present invention, the waterborne polyurethane acrylate emulsion is characterized in that the polyurethane acrylate prepolymer comprises the following raw material components by weight in part:

| | |
|---|---|
| oligomeric diol | 30~60 |
| polyisocyanate | 5~20 |
| second UV-curable monomer | 40~60. |

The polyurethane acrylate prepolymer synthesized from the above-mentioned raw materials is not self-emulsified or dispersed in immiscible liquids. Thus, it exhibits good compatibility with the polyurethane acrylate oligomer and the first UV-curable monomer.

According to the fourth aspect of the present invention, the waterborne polyurethane acrylate emulsion further comprises the following raw material components: first UV-curable monomer and water.

The first UV-curable monomer provides a higher degree of functionality, ensuring the crosslinking density of the waterborne polyurethane acrylate emulsion upon curing, thus further enhancing its wear resistance.

Optionally, both the first UV-curable monomer and the second UV-curable monomer are acrylates.

Unsaturated acrylate compounds include at least one of the following: trimethylolpropane triacrylate, pentaerythritol triacrylate or tetraacrylate (PETA), dipentaerythritol pentaacrylate or hexaacrylate (DPHA), and their modified compounds, hydroxyethyl acrylate (HEA), hydroxypropyl acrylate (HPA), hydroxybutyl acrylate (HBA), hydroxyethyl methacrylate (HEMA), and hydroxypropyl methacrylate (HMPA).

Preferably, the acrylate is one or more of pentaerythritol triacrylate or pentaerythritol tetraacrylate (PETA), dipentaerythritol pentaacrylate (DPHA) and its modified compounds, dipentaerythritol hexaacrylate, and hydroxyethyl acrylate (HEA).

Optionally, the raw material components of the polyurethane acrylate oligomer include diisocyanates and acrylates.

According to the fifth aspect of the present invention, the waterborne polyurethane acrylate emulsion is characterized in that, the number average molecular weight of the polyurethane acrylate prepolymer is in the range of 2000 to 5000, and the functionality thereof is between 6 and 10;

the number average molecular weight of the polyurethane acrylate oligomer is in the range of 1000 to 2000, and the functionality thereof is between 3 and 10;

the functionality of the first UV-curable monomer is in the range of 3 to 6.

The functionality refers to the number of functional groups, specifically unsaturated double bonds, involved in the UV-curing reaction. It affects the degree of crosslinking during the curing process of the coating. A higher functionality leads to a higher degree of crosslinking during the curing process, which is beneficial for improving the wear resistance of the cured film. However, coatings with excessively high functionality are not suitable for thick coatings as the film may crack. Therefore, selecting polymers and monomers with appropriate functionality and controlling the proportions of each component helps to improve the performance of the water-borne polyurethane acrylate emulsion.

According to the sixth aspect of the present invention, the water-borne polyurethane acrylate emulsion comprises the following raw material components in parts by weight:

| | |
|---|---|
| polyurethane acrylate prepolymer | 20~80 |
| polyurethane acrylate oligomer | 5~30 |
| the first UV-curable monomer | 0~50 |
| water | 50~70. |

According to the seventh aspect of the present invention, the water-borne polyurethane acrylate emulsion comprises the following raw material components in parts by weight:

| | |
|---|---|
| polyurethane acrylate prepolymer | 20~80 |
| polyurethane acrylate oligomer | 5~70 |
| the first UV-curable monomer | 0~30 |
| water | 50~70. |

According to the eighth aspect of the present invention, in order to balance wear resistance and fineness, the water-borne polyurethane acrylate emulsion is characterized in that the molar ratio of the polyurethane acrylate oligomer to the first UV-curable monomer is in the range of 0.03:1 to 1.05:1.

According to the ninth aspect of the present invention, the water-borne polyurethane acrylate emulsion is characterized in that the molar ratio of the polyurethane acrylate oligomer to the first UV-curable monomer is in the range of 0.30:1 to 0.75:1.

According to the tenth aspect of the present invention, the waterborne polyurethane acrylate emulsion is characterized in that, the oligomeric diol is selected from one or more of polyoxypropylene glycol, polyoxyethylene glycol, polyhexamethylene glycol, polytetrahydrofuran diol, polycarbonate diol, and polyester diol; and the polyisocyanate is selected from one or more of diisocyanate, isophorone diisocyanate (IPDI), hexamethylene diisocyanate (HDI), 4,4'-methylenebis(cyclohexyl isocyanate) (HMDI), diphenylmethane diisocyanate (MDI), toluene diisocyanate (TDI), and trimer of 4,4'-dicyclohexylmethane diisocyanate (HMDI).

Preferably, the nonionic oligomeric diol includes polyoxyethylene glycol and its derivatives with a molecular weight of 200-2000 g/mol. More preferably, polyoxyethylene glycol with a molecular weight of 1000 g/mol is used.

Preferably, the polyisocyanate is diisocyanate, and more preferably is isophorone diisocyanate (IPDI) and 4,4'-dicyclohexylmethane diisocyanate (HMDI), either one or both.

According to the eleventh aspect of the present invention, a method for preparing a waterborne polyurethane acrylate emulsion comprises the following steps:

mixing oligomeric diol and polyisocyanate so that they react to produce nonionic polyurethane;

the nonionic polyurethane is mixed and reacted with a second UV curable monomer to obtain polyurethane acrylate prepolymer;

the polyurethane acrylate prepolymer, polyurethane acrylate oligomer, and the first UV curable monomer are mixed and dispersed in water to obtain water-borne polyurethane acrylate emulsion.

Optionally, a polymerization inhibitor can be added during the reaction between the nonionic polyurethane and the acrylate. The polymerization inhibitor helps to prevent the gellation of the synthesized polyurethane acrylate.

Optionally, the polymerization inhibitor can be selected from one or more of the followings: p-methoxyphenol, p-hydroxyanisole, p-tert-butylcatechol, and tert-butyl p-benzoquinone.

According to the twelfth aspect of the present invention, a waterborne matt coatings is provided, characterized in that it includes any one of the waterborne polyurethane acrylate emulsions as claimed in claims 1 to 11.

Compared to the prior arts, the present application has at least one of the following technical effects.

Compared to the prior arts, the waterborne polyurethane acrylate emulsion of the present invention, which is a waterborne UV-curable nonionic polyurethane acrylate emulsion, reduces the amount of organic solvents used and produces a water-borne polyurethane acrylate emulsion with low VOCs content. It imparts excellent matting powder encapsulation properties to the emulsion, resulting in a fine matte fineness of the matt coating. Moreover, the emulsion improves the high wear resistance of the coatings by ways of both the resin synthesis and emulsification components, addressing the issue of poor emulsion compatibility.

A method for preparing a nonionic polyurethane acrylate prepolymer:

step 1: remove water in nonionic oligomeric diol at a temperature of 70-140° C. under vacuum for 30-180 minutes, and test the water content of the oligomeric diol to ensure it is ≤0.2 wt %, cool the temperature of materials down to a temperature of 40-70° C., add the polyisocyanate and catalyst, and then raise the temperature of materials to 60-85° C., maintain the temperature for 60-180 minutes until the desired NCO content is reached, obtaining the nonionic polyurethane;

step 2: cool down the nonionic polyurethane obtained in step 1 to a temperature of 40-70° C., add unsaturated acrylate, polymerization inhibitor, and catalyst to the nonionic polyurethane, then, raise the temperature of the materials to a temperature of 60-85° C., maintain the temperature for 60-240 minutes, and this will yield the nonionic polyurethane acrylate prepolymer.

A method for preparing a waterborne polyurethane acrylate emulsion is as follows:

step 1: mix the waterborne UV-curable polyurethane acrylate prepolymer, UV-curable oligomers, and UV-curable diluting monomers together, stir and disperse the mixture at a speed of 200-1000 rpm until it is uniformly mixed, obtaining a mixture.

step 2: under the condition of stirring and dispersing at a speed of 600-2500 rpm, add a specified amount of deionized water for emulsification, obtaining a waterborne polyurethane acrylate emulsion with high wear resistance.

EMBODIMENTS

The following is a further explanation of the technical solution described in this application, but the scope is not limited to these.

Examples 1 to 3

1. Preparation of Waterborne Polyurethane Acrylate Emulsion (1) Preparation of Polyurethane Acrylate Prepolymer The following table (Table 1) illustrates the proportions of raw materials in parts by weight. Polyoxyethylene glycol and polycarbonate diol are added to a glass reaction vessel equipped with mechanical stirrer, a temperature sensor, and a vacuum device. The mixture is subjected to a water removal process at a temperature of 100° C. and a vacuum pressure of 0.09 MPa for 60 minutes. The water content of the oligomeric diol is tested to ensure it is ≤0.2 wt %. The temperature is then lowered to 50° C., and isophorone diisocyanate and organobismuth are added. The temperature is raised to 80° C. and maintained for 120 minutes until the residual —NCO reaches the specified value of 7.5 wt %. The temperature is lowered again to 50° C., and the unsaturated acrylate, organobismuth, and p-hydroxyanisole are added. The temperature is raised to 80° C. and maintained for 120 minutes until the residual —NCO reaches 0.1 wt %, thus obtaining the polyurethane acrylate prepolymer.

(2) Preparation of Waterborne Polyurethane Acrylate Emulsion

According to the proportions of the raw materials in Table 2, the polyurethane acrylate prepolymer, polyurethane acrylate oligomer, and trimethylolpropane triacrylate are mixed and dispersed at 1000 rpm for 30 minutes until a homogeneous mixture is obtained. The stirring speed is then set to 1500 rpm, and water is added and stirred for emulsification, resulting in a waterborne polyurethane acrylate emulsion. The typical properties of the obtained waterborne polyurethane acrylate emulsion are tested, and the results are shown in Table 3.

2. Preparation of Waterborne Matt Coatings

Take 44 parts by weight of waterborne polyurethane acrylate emulsion and place it in a PE cup. Start the dispersing machine and adjust the speed to 1500 rpm. While dispersing, add 8 parts of water to dilute the emulsion. Then, add 1 part of photoinitiator 1173, 0.1 part of wetting agent BYK-346, 0.1 part of leveling agent BYK-162, and 2 parts of propylene glycol methyl ether, in order. Finally, continue stirring and dispersing at 1500 rpm for 15 minutes. Then filter the resulting material through a 400-mesh filter cloth to obtain a waterborne high gloss coatings.

Spray the obtained waterborne high gloss coatings onto a transparent PC panel with a film thickness of 10-15 μm. Bake the coated panel at 60° C. for 10 minutes and cure the coatings into a film using a UV curing machine with an energy of 800 mJ/cm². Test the coating film's RCA (wear resistance), and the results are shown in Table 4.

Add 2.2 parts of matting powder (Tosoh, E-1011) into the aforementioned waterborne high gloss coatings. Continue stirring and dispersing at 1500 rpm for 15 minutes, then filter the mixture through a 200-mesh filter cloth to obtain waterborne matt coatings.

Spray the obtained waterborne matte coatings onto black ABS or black PC+ABS panels with a film thickness of 15-20 μm. Bake at 60° C. for 10 minutes, then cure the coating using a UV curing machine with an energy of 800 mJ/cm². Observe and test the adhesion, matting effect, blooming, and hardness of the coatings. The results are shown in Table 4.

The catalyst used in the present invention is an organobismuth compound.

Comparison Examples 1~2

Waterborne polyurethane dispersions UCECOAT® 7230 (produced by Allnex, USA) and waterborne polyurethane dispersions RA7011 (produced by Mitsui Resin Co. Ltd, Japan) were used respectively as replacements for the waterborne polyurethane acrylic emulsions in Examples 1-3. Waterborne high gloss coatings and waterborne matt coatings were prepared using these dispersions, and they were sprayed and cured on the same kind of substrate for performance testing. The results are shown in Table 4.

TABLE 1

Raw material components of the polyurethane acrylate prepolymer in the examples of the present invention

| Component | Example 1 | Example 2 | Example 3 |
|---|---|---|---|
| Polyoxyethylene glycol, molecular weight 1000 g/mol | 20 | 16 | 16 |
| Polycarbonate diol, molecular weight 1000 g/mol | 20 | 16 | 16 |
| Isophorone diisocyanate | 13 | 11 | 11 |
| Pentaerythritol triacrylate | 0 | 16 | 0 |
| Dipentaerythritol pentaacrylate | 47 | 41 | 57 |
| Organobismuth | 0.1 | 0.1 | 0.1 |
| 4-Methoxyphenol | 0.05 | 0.05 | 0.05 |

TABLE 2

Raw material components of the waterborne polyurethane acrylate emulsion in the examples of the present invention

| Component | Example 1 | Example 2 | Example 2 |
|---|---|---|---|
| Polyurethane acrylate prepolymer | 26 | 26 | 26 |
| Polyurethane acrylate oligomer | 6 | 12 | 20 |
| Pentaerythritol triacrylate | 18 | 12 | 4 |
| water | 50 | 50 | 50 |

TABLE 3

Physical and chemical properties of waterborne polyurethane acrylate emulsion of the present invention

| Physical and chemical properties | Test results |
|---|---|
| Appearance | bluish milky white |
| Solid content | 45~50% |

TABLE 3-continued

Physical and chemical properties of waterborne polyurethane acrylate emulsion of the present invention

| Physical and chemical properties | Test results |
|---|---|
| Viscosity (cP@25° C.) | 50~500 |
| pH value | 5~8 |
| Particle size (nm) | 80~200 |

The test methods used are as follows:
Appearance of emulsion: visual inspection
Solid content: national standard
Viscosity: Brookfield Viscometer, 16 #spindle @200 rpm, national standard
pH value: national standard pH meter
Particle size: dynamic light scattering

TABLE 4

Performance test results of waterborne matt coatings in examples of the present invention and comparasion examples

| Test | Example 1 | Example 2 | Example 2 | Comparison Example 1 | Comparison Example 2 |
|---|---|---|---|---|---|
| Adhesion | 5B | 5B | 5B | 5B | 5B |
| Matte fineness | Excellent | Excellent | Excellent | Average | Average |
| Blooming of coating film | None | None | None | Slight | Slight |
| Mitsubishi pencil hardness | H | 2H | 3H | 2H | H |
| Pendulum hardness (number of oscillations) | 235 | 241 | 249 | 229 | 215 |
| RCA test (number of counts) | 101 | 159 | 230 | 89 | 75 |

The test methods used are as follows:
Adhesion: 100 grids method
Matting powder fineness and coating film blooming: visual inspection
Mitsubishi pencil hardness: national standard
Pendulum hardness: Pendulum hardness tester
RCA test: RCA Abrasion Wear Tester. Regarding the preparation of samples for RCA test, 44 parts by weight of waterborne polyurethane acrylate emulsion and a certain amount of waterborne acrylic resin are placed in a PE cup and the subsequent procedure to prepare waterborne matt coatings is the same as that described above. The purpose of adding waterborne acrylic resin is to reduce the number of counts of RCA tests. Otherwise, without adding waterborne acrylic resin, the number of counts of RCA tests for the emulsion alone would be too high.

From Table 4, it can be seen that compared to the Comparison Examples 1-2 using commercially available waterborne polyurethane dispersions, the waterborne polyurethane acrylate emulsions of the present invention in Examples 1-3 exhibit superior matte fineness, no blooming, and high hardness after forming matt coating films.

The description of the embodiments above is provided to facilitate understanding and utilization of the invention by those skilled in the art. However, those skilled in the relevant field may make appropriate modifications and variations to the described embodiments. Therefore, the present application is not limited to the specific embodiments disclosed and described above, and any modifications and variations of the invention should fall within the scope of the claims of this application.

What is claimed is:

1. A waterborne polyurethane acrylate emulsion, characterized by comprising the following raw material components in parts by weight:
   polyurethane acrylate prepolymer 20~80
   polyurethane acrylate oligomer 5~30
   first UV-curable monomer 0~50
   water 50~70;
   preparation of the waterborne polyurethane acrylate emulsion:
   mixing a diol oligomer and a polyisocyanate so that they react to obtain a nonionic polyurethane;
   reacting the nonionic polyurethane with a second UV-curable monomer to obtain the polyurethane acrylate prepolymer having hydrophilicity;
   mixing the polyurethane acrylate prepolymer, polyurethane acrylate oligomer, and the first UV-curable monomer and dispersing them in water to obtain a waterborne polyurethane acrylate emulsion.

2. The waterborne polyurethane acrylate emulsion according to claim 1, characterized in that, by weight, the polyurethane acrylate prepolymer comprises the following raw material components:
   oligomeric diol: 30-60 parts polyisocyanate: 5-20 parts second UV-curable monomer: 40-60 Parts.

3. The waterborne polyurethane acrylate emulsion according to claim 1, characterized in that:
   the number average molecular weight of the polyurethane acrylate prepolymer is 2000-5000 and the functionality thereof is 6-10
   the number average molecular weight of the polyurethane acrylate oligomer is 1000-2000 and the functionality thereof is 3-10
   the functionality of the first UV-curable monomer is 3-6.

4. The waterborne polyurethane acrylate emulsion according to claim 1, characterized in that the molar ratio of the polyurethane acrylate oligomer to the first UV-curable monomer is in the range of 0.03:1 to 1.05:1.

5. The waterborne polyurethane acrylate emulsion according to claim 4, characterized in that the molar ratio of the polyurethane acrylate oligomer to the first UV-curable monomer is in the range of 0.30:1 to 0.75:1.

6. The waterborne polyurethane acrylate emulsion according to claim 1, characterized in that,
   the oligomeric diol being selected from one or more of polyoxypropylene glycol and its derivatives, polyoxyethylene glycol and its derivatives, polyhexamethylene diol, polytetrahydrofuran diol, polycarbonate diol, polyester diol; and
   the polyisocyanate being selected from one or more of diisocyanates, isophorone diisocyanate, hexamethylene diisocyanate, 4,4'-methylenebis(cyclohexyl isocyanate), diphenylmethane diisocyanate, toluene diisocyanate, or a trimer of 4,4'-dicyclohexylmethane diisocyanate.

7. A waterborne matt coatings, characterized in that it comprising the waterborne polyurethane acrylate emulsion according to claim 1.

\* \* \* \* \*